(No Model.)

W. H. H. BARTON.
TELETHERMOMETER.

No. 305,499. Patented Sept. 23, 1884.

Witnesses:

Inventor:
Wm. H. H. Barton
by J. L. Barton
Atty

UNITED STATES PATENT OFFICE.

WILLIAM HENRY HARRISON BARTON, OF BROCKTON, MASSACHUSETTS.

TELETHERMOMETER.

SPECIFICATION forming part of Letters Patent No. 305,499, dated September 23, 1884.

Application filed April 14, 1884. (No model.)

*To all whom it may concern:*

Be it known that I, WILLIAM H. H. BARTON, a citizen of the United States of America, residing at Brockton, in the county of Plymouth and State of Massachusetts, have invented certain new and useful Improvements in Telethermometers; and I do hereby declare the following to be a full, clear, and exact description of the invention, such as will enable others skilled in the art to which it appertains to make and use the same.

My invention relates to thermometric electric instruments which indicate the fluctuations in the temperature of the atmosphere, and automatically operate an alarm by means of opening or closing an electric galvanic circuit when the temperature rises or falls above or below a certain fixed degree.

The invention consists in opening or closing an electric galvanic circuit by means of a vibrating needle-arm coming in contact with adjustable slides to which are connected or attached the wires from a galvanic battery. The needle-arm is connected with a standard on a metallic plate, and is vibrated by the contraction or expansion of a bimetallic circular strip, which is fixed at one end and supported by a standard on the metallic plate, and is movably connected at the other end with the needle-arm; and the invention consists, further, in devices and combinations hereinafter more fully described and claimed.

Figure 1:
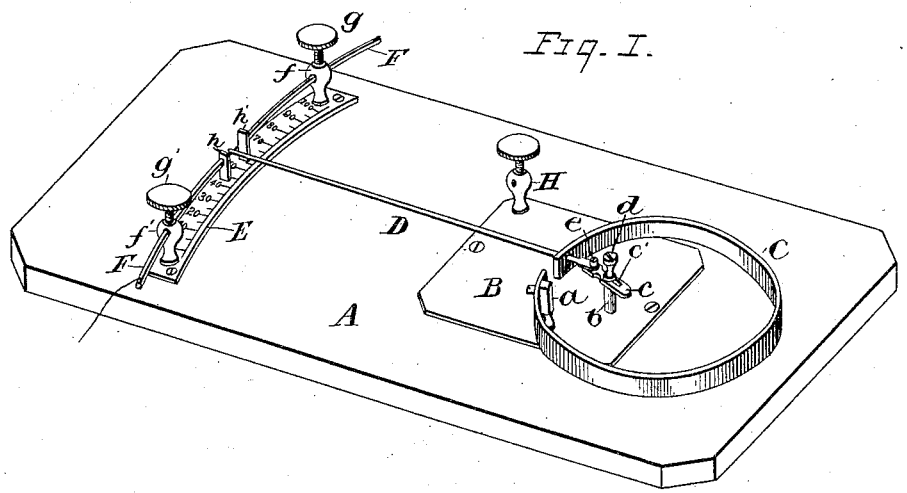
Figure 2:
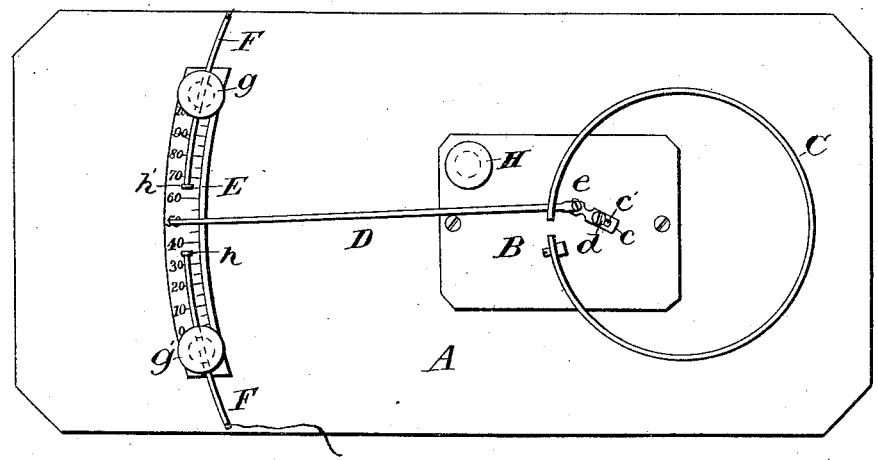

In the accompanying drawings, which illustrate my invention, Figure 1 is a perspective view of the device, and Fig. 2 is a top plan view of the same.

Similar letters refer to similar parts in the different views.

The base A is of hard wood or other practically non-conducting material, which serves to insulate the metallic plate B, suitably attached thereto. The plate B carries a metallic standard, $a$, to which one end of a bimetallic strip, C, circular in form, is rigidly connected, the other end of the bimetallic strip being left free. This strip C is exceedingly sensitive to any and all increments and decrements of heat which cause it to expand or contract.

Attached to the plate B, and inside of the strip C, is a metallic standard or support, $b$, to which is connected a bar or link, $c$. The bar or link $c$ is provided with a slot, $c'$, and is adjustably clamped to the standard $b$ by means of a set-screw, $d$. A long metallic needle-arm, D, is passed through the free end of the bimetallic strip C, and is pivotally connected on the inside of said strip to the bar or link $c$ at $e$, as shown.

It is clearly obvious that any contraction or expansion of the bimetallic strip C will cause the needle-arm or lever D to vibrate, and that such vibration will be co-extensive with the fluctuations in the temperature of the atmosphere.

At the outer end of the needle D is placed, on the base-board A, a metallic strip, E, having thereon a suitable scale for the purpose of measuring the vibrations of the lever or needle-arm D, and consequently to indicate the degree of heat.

At each end of the metallic strip E are placed metallic knobs or buttons $f f'$, through which are passed metallic slides F F'. These slides are adjustably secured to the supports $f f'$ and on the metallic plate E by means of the clamping-screws $g$ and $g'$. The inner ends of the adjustable slides are flattened or turned down to rest upon the plate E, and to afford a broad bearing or contacting surface for the needle D.

To the outer end of one of the slides F F' is attached a wire leading from one pole of a galvanic battery, and to the metallic binding-screw H, on the metallic plate B, is attached a wire which connects with an electric bell and leads thence to the other pole of the galvanic battery. The adjustable slides being fixed at any predetermined degree of heat on the scale upon which an alarm is to be given, when this temperature is reached the needle-arm will contact with the adjustable slide and open or close the circuit, as may be desired, and so sound the alarm, as readily understood by those skilled in the art to which this invention pertains.

Having thus fully described my invention, what I claim, and desire to secure by Letters Patent, is—

1. A telethermometer consisting of an insulated plate supported on a suitable standard, a bimetallic strip having one end rigidly secured thereto and its free end embracing an adjustable bar or link pivoted inside of the metallic strip, and a scale carrying adjustable slides, the adjustable slides being adapted to be connected with a galvanic battery, and the plate carrying the bimetallic strip and needle being adapted to be connected with an electric alarm, all substantially as described, and for the purpose set forth.

2. The combination of the single circular bimetallic strip C with the adjustable needle-arm D, pivoted inside of the metallic strip C and passing through its free end, and the scale-plate E, all substantially as and for the purpose described.

In testimony whereof I affix my signature in presence of two witnesses.

WILLIAM HENRY HARRISON BARTON.

Witnesses:
IRA A. LEACH,
HORACE BAKER.